United States Patent [19]

Voegtlin

[11] Patent Number: 4,750,413
[45] Date of Patent: Jun. 14, 1988

[54] APPARATUS FOR CENTERING AND SHAPING DOUGH PIECES BAKED PRODUCTS OR THE LIKE

[76] Inventor: René Voegtlin, 2, rue de la Colline, Oberhausbergen, 67200 Strasbourg, France

[21] Appl. No.: 933,995

[22] Filed: Nov. 24, 1986

[30] Foreign Application Priority Data

Dec. 2, 1985 [FR] France .................. 85 17909

[51] Int. Cl.$^4$ ............................................. A21C 11/00
[52] U.S. Cl. ...................... 99/353; 99/443 C; 425/332; 425/364 R; 426/496
[58] Field of Search ............ 426/496, 500, 501–503, 426/513, 94; 425/319, 320, 324.1, 332, 333, 328, 363, 364 R, 364 B, 374, 383, 391, 394, 238; 99/353, 443 C

[56] References Cited

U.S. PATENT DOCUMENTS

| | | | |
|---|---|---|---|
| 20,577 | 6/1958 | Neer ............................... | 425/332 |
| 942,154 | 12/1909 | Van Houten, Jr. ............ | 425/332 |
| 1,192,973 | 8/1916 | Allison ........................... | 425/333 |
| 1,824,759 | 9/1931 | Bainbridge ..................... | 425/332 |
| 2,790,397 | 4/1957 | Winkler .......................... | 425/332 |
| 2,858,775 | 11/1958 | Marasso ......................... | 425/332 |
| 3,354,843 | 11/1967 | Velazquez et al. . | |
| 3,521,578 | 7/1970 | Fraioli, Sr. ..................... | 425/332 |
| 4,025,273 | 5/1977 | Mauer et al. .................. | 425/332 |
| 4,281,025 | 7/1981 | Longenecker .................. | 426/496 |
| 4,555,226 | 11/1985 | Benier ............................. | 425/363 |
| 4,634,364 | 1/1987 | Voegtlin ......................... | 425/394 |

FOREIGN PATENT DOCUMENTS

| | | | |
|---|---|---|---|
| 451581 | 7/1925 | Fed. Rep. of Germany ...... | 425/364 |
| 1028952 | 4/1958 | Fed. Rep. of Germany ...... | 425/364 |
| 3323918 | 12/1984 | Fed. Rep. of Germany ...... | 425/391 |
| 2145894 | 1/1973 | France . | |
| 2401614 | 3/1979 | France . | |
| 2500266 | 8/1982 | France . | |
| 637711 | 4/1962 | Italy ................................... | 425/364 |

Primary Examiner—Jan H. Silbaugh
Assistant Examiner—Jill L. Fortenberry
Attorney, Agent, or Firm—Sandler & Greenblum

[57] ABSTRACT

The invention relates to an apparatus for centering and shaping dough pieces baked products or the like which is inserted between two treatment machines in a commercial baking line for the production of bread or similar baked products, for example between a dividing and weighing machine and a prefermentation chamber, or between a prefermentation chamber and a shaping and alongating machine, this apparatus comprising a conveyor for feeding the ball-shaped dough pieces from the dividing and weighing machine or the prefermentation chamber, an endless belt conveyor of which the outer face comprises rack means consisting of transverse bars, two parallel guideways disposed at the input end of the apparatus and overlying said endless conveyor belt, a centering spout consisting of two convergent vertical walls and disposed downstream of said guideways, a shaping channel having an inner width inferior to the spacing of said pair of parallel guideways and disposed downstream of said centering spout, a plurality of successive equalizing blades having operative surfaces provided with transverse bars adapted to cooperate with the transverse bars of said endless belt and pivoting about a transverse axis while engaging said shaping channel, and thrust means for positively and sequentially inserting the substantially cylindrical dough pieces issuing from the apparatus into the nip of a pair of rollers of a shaping and elongating machine.

10 Claims, 2 Drawing Sheets

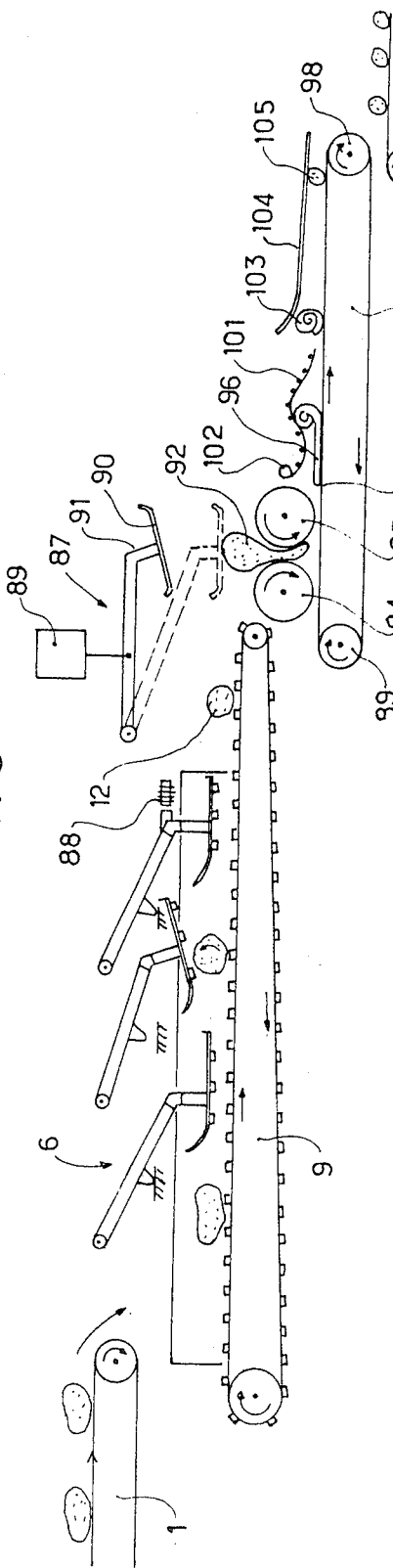
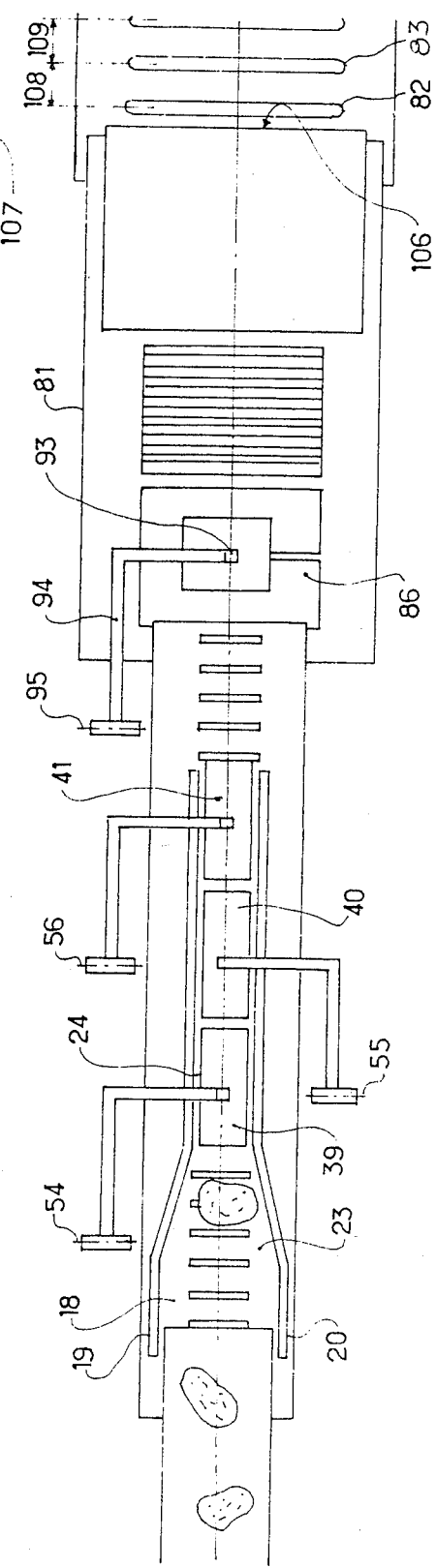

APPARATUS FOR CENTERING AND SHAPING DOUGH PIECES BAKED PRODUCTS OR THE LIKE

BACKGROUND OF THE INVENTION

1. FIELD OF THE INVENTION

The present invention relates to an apparatus for centering and shaping dough pieces or loaves or the like between two treatment machines in a commercial breadmaking line for the production of bread and similar products, notably between a dividing and weighing machine and a prefermentation chamber, or between a prefermentation chamber and a shaping and elongating machine in this line.

2. THE PRIOR ART

Traditionally, when the dough mixing step is completed, the mixed dough is directed to a dividing and weighing machine which delivers dough loaves which are subsequently transferred to a rounder in order to convert each loaf into a ball, these dough balls being then delivered to a belt conveyor. This belt conveyor transfers the dough balls to a prefermentation chamber from which another conveyor belt transfers the prefermented balls to a shaping and elongating machine when it is desired to obtain long bread or loaves.

In fact, though on the whole the dough pieces received from the rounder or the prefermentation chamber have the same weight, their shape may vary considerably.

Theoretically, these dough pieces should be ball-shaped, but in actual practice they have the appearance of unshapely cakes and differ appreciably from one another, a feature most likely to be prejudicial to the next operations.

Moreover, notably when the dough pieces are brought directly by the conveyor belt to the molding or rolling section of a shaping and elongating machine, the elongated loaves issuing from this machine are in a rather eccentric relationship to one another; besides, their lengths differ considerably and they are laid on the next conveyor belt at an irregular rate.

In an ordinary baker's shop, these inconveniences are not really detrimental since an operator picks up manually the dough pieces as they emerge from the shaping and elongating machine. While the operator lays the dough pieces manually on their fermentation support, he corrects the defects as they turn up.

On the other hand, in commercial baking the above-mentioned inconveniences are extremely detrimental. Therefore, the remedy consists in:

either appointing an operator for correcting these defects manually, this measure contrasting with the aims of industrial production methods, or interposing mechanical means adapted to correct the defects after the shaping operation, but in the present state of the art this intervention can only be carried out by using rather empirical means.

Irregularities in the final products are generally not ascribable to defects inherent to shaping-elongating machines but in many instances these defects are due to alignment and shape discrepancies in the dough pieces conveyed by the endless belt and also to differences in the rate at which these pieces are introduced into the molding or rolling section of the shaping and elongating machine.

Thus, not only a faulty alignment, that is, the presence of dough pieces axially off-set in relation to the axis of the shaping-elongating machine, but also differences in shape have noxious repercussions at the outlet end of the shaping-elongating machine. In fact, the elongated or oblong balls delivered by this machine have different lengths and are off-centered, especially when a dough piece has a greater volume on one side than on the other side of its path.

Even if it is assumed that the dough pieces are translated at a regular rate along the conveyor belt, there is by no means any certainty that the balls emerging from the shaping-elongating machine are delivered at a regular rate from the machine rollers. In fact, when a ball-shaped dough piece fed by the conveyor belt is delivered to these rollers, this piece will usually slip during a variable time on the rollers before it is caught by these rollers. This slippage difference, of the order of a few tenths of a second, between successive balls is attended by appreciable variations in the output rate of the elongated loaves emerging from the shaping-elongating machine, since the balls in an industrial baking plant are fed at a rate of one every two seconds, and even at a faster rate in certain bread manufacturing plants.

Various attempts have been made in order to remedy these inconveniences. Thus, for example, conveyors with endless belts with up-turned side edges have been proposed in order better to center the dough pieces before introducing them into the shaping-elongating machine. For the same purpose, a kind of funnel was arranged between the feed conveyor and the rollers of the shaping machine. Furthermore, in order to equalize the height of the dough pieces and force these pieces into the shaping-elongating machine, a fixed or travelling band was disposed above the delivery end of the feed conveyor.

However, these various empirical means did not give really satisfactory results, for it appeared that their action was far from positive and therefore inadequate for levelling the irregularities of the elongated balls or loaves obtained at the outlet end of the shaping-elongating machine.

SUMMARY OF THE INVENTION

It is the primary object of the present invention to provide an apparatus substituted for the conventional rounder and adapted to be interposed between the divider-weigher and the prefermentation chamber, and to positively recenter the dough pieces while imparting a strictly identical shape to each dough piece.

According to a preferred form of embodiment, this apparatus, disposed between an endless feed conveyor belt and a shaping-elongating machine, is furthermore capable of inserting the dough pieces without any slipping or hesitation between the rollers of the rolling section of the shaping-elongating machine.

For this purpose, the present invention provides a machine for centering and shaping baking dough pieces or the like in a commercial breadmaking line, this machine being interposed between two complementary machines in the commercial line for the industrial production of bread and similar products, for example between a dividing and weighing machine and a prefermentation chamber, or between a prefermentation chamber and a shaping-elongating machine, this apparatus comprising a feed conveyor for transferring the substantially ball-shaped dough piece received from said dividing and weighing machine or from said prefermentation chamber, an endless conveyor belt provided on its outer surface with spaced teeth consisting of transverse bars, a pair of parallel guideways overlying the inlet end of the apparatus' endless belt, a spout-like centering device disposed downstream of said guideways and consisting of two convergent guide walls, a shaping channel somewhat narrower than the relative spacing of said parallel guideways and disposed downstream of said spout-like centering device, a succession of equalizing blades having their operative faces provided with transverse bars adapted to cooperate with said toothforming transverse bars of said endless belt and to pivot about a transverse axis when engaging said shaping channel, and thrust means adapted to positively introduce each dough piece, to which a substantially cylindrical configuration has previously been imparted by the apparatus, into the nip of a pair of rollers of the rolling section of the shaping-elongating machine.

The advantageous results obtained with the arrangement according to the present invention lie essentially in that the apparatus is capable of positively recentering the dough pieces while imparting to each dough piece a strictly identical shape to facilitate the commercial baking of bread and/or other similar products. Another important feature characteristising the present invention results from the combination of the centering and shaping spout with thrust means to prevent the elongated balls received from the shaping and elongating machine from being dispensed at an irregular rate while preserving a regular output corresponding to the input rate. This rate regularity is particularly important when the elongated balls or loaves are fed continuously to the end fermentation tunnel, the baking tunnel or the deep-freezing tunnel.

This invention will be better understood from the following description given with reference to the attached drawings illustrating diagrammatically by way of example a typical and preferred form of embodiment of the invention.

THE DRAWINGS

FIG. 1 is a diagrammatic side-elevational and sectional view showing the dough piece centering and shaping section of the apparatus for making bread or other similar products, this apparatus being disposed between a feed conveyor of any suitable type and a discharge or delivery conveyor directing the centered and shaped dough pieces to a downstream machine in a commercial baking line, FIG. 2 is a diagrammatical plan view from above of the apparatus of FIG. 1, FIG. 3 is a view similar to FIG. 1 showing the dough-piece centering, shaping nd conveying section of the apparatus, which delivers the dough pieces to the rollers of a shaping-elongating machine of any suitable type which are interposed between any suitable dough-piece delivering conveyor and said shaping-elongating machine equipped with a discharge conveyor, and FIG. 4 is a diagrammatical plane view from above of the apparatus of FIG. 3.

DESCRIPTION OF THE PREFERRED EMBODIMENT

Figure 1:
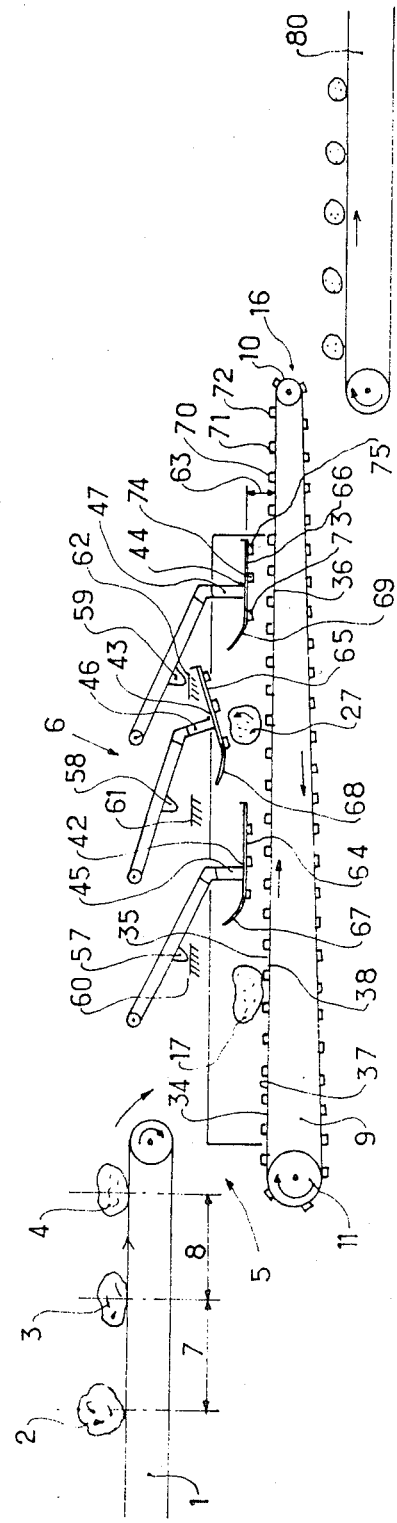
Figure 2:
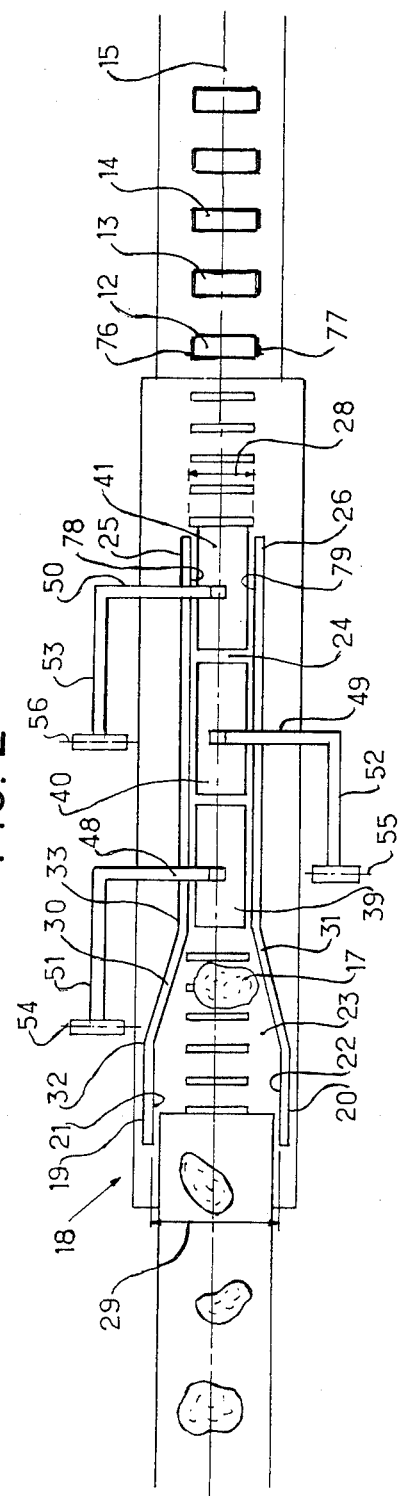

Referring first to FIGS. 1 and 2 of the drawings, a feed conveyor 1 delivers balls or loaves of baking dough or the like 2, 3, 4 . . . , all of same weight, to the input end 5 of a centering and shaping machine 6. The relative spacings 7, 8 between the various dough pieces 2, 3, 4 are identical and consequently the balls 2, 3, 4 are delivered to the input end 5 of said machine 6 at a regular rate.

The machine 6 comprises essentially an endless belt conveyor 9 passing around a driven cylinder 10 and a driving or power cylinder 11 disposed adjacent the feed conveyor 1. To obtain rolled dough pieces 12, 13, 14 of same length and perfectly centered to the general axis of operation 15 at the output end 16 of the machine 6, various means cooperating with the means consisting of the endless belt 9, for carrying along the dough piece or ball 17, are provided.

The first means is a guide means 18 disposed at the input end of machine 6 and consisting of a pair of guideways 19, 20 having registering and opposite operative inner walls 21, 22. The pair of guideways 19, 20 are widely spaced from each other and the dough pieces or balls 2, 3, 4 from feed conveyor 1 are dropped between the guideways 19, 20.

This first guide means 18 is followed by a centering spout 23 disposed between the two guideways 19, 20 and a shaping channel 24 comprising a pair of parallel vertical walls 25, 26 adapted to restrict the lateral expansion of the dough pieces 27 engaged in said guide channel 24 as they emerge from the centering spout 23. The inner width 28 of shaping channel 24 is inferior to the distance 29 between the two guideways 19, 20 of guide means 18. The centering spout 23 consists of a pair of convergent walls 30, 31 connecting the rear end 32 of guideways 19, 20 to the front end 33 of the parallel vertical walls 25, 26 of shaping channel 24. The lower edges 34, 35, 36 of guideways 19, 20 of said convergent walls 30, 31 and parallel vertical walls 25, 26 are nearly in contact with the top surface 37 of the upper or operative span 38 of endless belt 9.

The equalizing means exerting an intermittent pressure on the top surface of dough pieces 27 consist of successive blades 39, 40, 41 disposed at the ends 42, 43, 44 of legs 45, 46, 47 rigidly coupled to arms 48, 49, 50 of bent levers 51, 52, 53 fulcrumed in a plane parallel to the upper operative span 38 of endless belt conveyor 9 about pivot pins 54, 55, 56, respectively. The levers 51, 52, 53 are so bent that each blade 39-41 can be raised independently of the others that is, without interfering with the other blades.

The pivot pins 54, 55, 56 extend at right angles to the general axis 15 of the endless belt conveyor and in the example shown in the Figures these pivot pins are disposed upstream of blades 39, 40, 41. Thus the blades 39-41, by pivoting about the pins 54-56, can be lowered between the lateral vertical walls 25, 26 and therefore their width is slightly inferior to the inner width of the shaping channel 24.

To avoid any crushing of the dough pieces 15 the downward movement of blades 39-41 is limited by providing each lever 51-53 with a stop 57, 58, 59 respectively, adapted to engage in their lowest position a corresponding fixed stop-block 60, 61, 62 setting the distance 63 between the operative surfaces 64, 65, 66 of blades 39-41 and the top surface 37 of the upper operative span 38 of the endless belt 9. During their progress along the treatment unit, the dough pieces 27 raise the various blades 39-41 sequentially. To prevent the dough pieces 27 from abutting the blades 39-41, these are provided with an up-turned curved input surface 67, 68, 69 which facilitates the penetration of the dough pieces 27 into the space left between the top surface 37 of the operative upper span 38 of endless belt 9 and the operative surfaces 64, 65, 66 of blades 39, 40, 41, respectively.

To ensure a positive and instantaneous seizing of each dough piece 2, 3, 4 brought by conveyor 1 to the input end of apparatus 6, the endless conveyor belt 9 comprises on its outer surface rack means consisting of transverse bars 70, 71, 72 of a length corresponding to the inner width 28 of shaping channel 24; these bars 70–72 extend substantially at right angles to the general axis of operation 15.

In addition, the operative surfaces 64–66 of blades 39–41 are also provided with rack means in the form of transverse bars 73, 74, 75 extending likewise at right angles to the general direction of travel 15 of the dough pieces.

The combined action produced by the toothed belt 9 and by the successive raising of the toothed blades 39–41 causes the dough pieces 27 to be perfectly smoothed out while imparting a substantially cylindrical shape to these dough pieces, the two parallel flat ends 76, 77 of these pieces 27 resulting from their bearing engagement with the inner faces 78, 79 of the parallel vertical walls 25, 26 of shaping channel 24.

This treatment is highly efficient provided that each dough piece 27 is caused to perform several turns on itself against the set of blades 39–41 during its passage through the shaping channel 24.

If relatively high production rates are used or required, at least two dough pieces 27 will be present simultaneously in the shaping channel 24, and therefore in the example illustrated at least three relatively short and independent blades 39, 40 and 41 are necessary since the simultaneous presence of two dough pieces 27 under a same blade 39, 40 or 41 would be detrimental to the shaping of the dough pieces 27 due to the inherent weight of the blade which cannot act properly on more than one dough piece at a time. In this case, one dough piece would be shaped at the detriment of another dough piece.

At the output end 16 of the machine 6 the endless belt conveyor 9 drops the shaped and centered dough pieces 12, 13, 14 on a delivery conveyor 80.

According to a modified application of the present invention the machine 6 is disposed between the input or feed conveyor 1 and a shaping-elongating machine 81. However, if the dough pieces 12, 13, 14 are deposited at a regular rate at the output end 16 of this machine 6, there is no certainty that these pieces will also be delivered at a regular rate in the form of elongated balls 82, 83 by the shaping-elongating machine 81 (FIG. 4). In fact, the dough pieces 12, 13, 14 might as well fall on the rollers 84, 85 of the rolling unit 86 of the shaping-elongating machine 81, and slip on these rollers 84, 85 during a variable time before they are caught by these rollers and rolled as desired.

For this purpose, the machine 6 is completed at its output end by thrust means 87 for positively causing the dough pieces 12, 13, 14 to be nipped by the rollers 84, 85 of the rolling unit 86 of the shaping-elongating machine 81.

Referring now to FIGS. 3 and 4 of the drawings, it will be seen that the thrust means 87 are disposed above the input area of rolling unit 86. The last blade 41 of the preceding machine 6 is provided with a preferably electrical sensor 88. Thus, each time a rolled dough piece 12, 13, 14 leaves the last blade 41, this blade 41 is released and drops by gravity to its inoperative position. During this movement, the blade 41 actuates the electric sensor 88 which, through suitable time-lag means, actuates a control mechanism 89 releasing in turn a thrust member 91 of which the flat head 90 strikes the underlying dough-piece 92 delivered at the same time to the nip formed between the two rollers 84, 85 of the rolling unit 86 of the shaping-elongating machine 81, the time-lag depending of course on the feed rate and also on the distance between the adjacent end of the last blade 41 and the rolling unit 86.

Thus, the cylindrical dough piece 92 is inserted directly into the nip of the squeezing rollers 84, 85 of rolling unit 81 without allowing any variable slipping time of the cylindrical dough-pieces 92 between the rollers 84, 85. The thrust member 91 is rigidly secured to the end 93 of a right-angled arm 94 pivoted to a fixed pin 95 parallel to the pivot pins 54, 55, 56 of blades 39, 40, 41 of the machie 6. The right-angled arm 94 is coupled to the control mechanism 89. The free fall of the flat head 90 of thrust member 91 is followed immediately by the drawback movement, under the control of the same control mechanism 89 of this head 90 through the medium of the right-angled arm 94 pivoting about its pin 95.

Consequently, the thrust member 91 is in a readiness position for dropping again upon the next dough piece so as to maintain a regular feed rate of dough-pieces inserted into the rolling unit 86. The subsequent passage of the thus inserted dough-pieces through the shaping-elongating machine 81 is well known in the art.

The two rollers 84, 85 of rolling unit 86 are driven for rotation in opposite dirctions so as to convert the substantially cylindrical dough piece 92 into a cake 96 subsequently taken over by another endless belt conveyor 97. This belt conveyor 97 passes around a driven cylinder 98 and a drive cylinder 99. The cake 96 pushed by the upper or drive span 100 of the endless belt conveyor 97 will thus form by rolling on itself a curled spiral between said upper span 100 and a weighted belt 101 anchored at one end 102.

With this arrangement, the resulting relatively short rolled or curled loaf 103 is interposed between the drive span 100 of endless conveyor belt 97 and the overlying shaping plate 104, whereby the loaf is elongated to its final length 105 at the output end 106 of the shaping and elongating machine 81.

The elongated loaves 82, 83 are taken over at the output end 106 of the shaping and elongating machine 81 by a delivery conveyor 107 corresponding to the delivery conveyor 80 of FIG. 1.

By virtue of the centering-shaping machine 6, in combination with the thrust means 87, and therefore of the means according to the present invention for inserting the loaves into the shaping-elongating machine 81, all the resulting loaves 82, 83 have the same length, are perfectly centered with respect to the general axis of operation 15 and also regularly spaced from one another. Since the distances 108, 109 are identical, the elongated loaves 82, 83 are constantly fed at a regular rate.

Of course, various modifications and changes may be brought to the component elements, the materials, the relative arrangements of the structure illustrated in the drawings and described hereinabove, which is given by way of example, without departing from the basic principles of the invention.

What I claim is:

1. Apparatus for centering and shaping ball-shaped dough pieces into substantially cylindrical dough pieces, the apparatus being situated between two treatment machines in a commercial baking line for the production of baked products, the apparatus comprising:
(a) a conveyor for feeding the ball-shaped dough pieces, received from one of the two treatment machines;
(b) an endless belt conveyor for receiving the ball-shaped dough-pieces from said conveyor moving toward the other of the two treatment machines, the upper surface of said endless belt conveyor comprising rack means provided with a plurality of transverse bars which run transverse to the direction of the movement of said endless belt conveyor;
(c) two parallel guideways disposed at and perpendicular to a receiving end of said endless belt conveyor and overlying said endless belt conveyor;
(d) a centering spout comprising at least two convergent walls perpendicular to said endless belt conveyor and disposed downstream of said guideways;
(e) a shaping channel having an inner width less than the spacing between said parallel guideways, said shaping channel being formed by two parallel walls, said walls being perpendicular to said endless belt conveyor and disposed downstream of said centering spout;
(f) a plurality of successive equalizing blades each having an operative surface provided with a plurality of spaced transverse bars cooperating with the transverse bars of said endless belt conveyor and pivoting about a transverse axis while engaging said ball-shaped dough pieces in said shaping channel and forming the substantially cylindrical dough pieces; and
(g) thrust means for delivering the substantially cylindrical dough pieces coming from said shaping channel into the other of the two treatment machines.

2. The apparatus of claim 1, wherein said equalizing blades are each disposed at the end of a leg rigidly coupled to one arm of a two-armed lever fulcrumed to said transverse axis perpendicular to the general direction of operation of the apparatus.

3. The apparatus of claim 1, wherein said equalizing blades are raised sequentially by the ball-shaped dough pieces and have a width slightly less than the inner width of said shaping channel, so that the ball-shaped dough pieces travel between the parallel walls of said shaping channel.

4. The apparatus of claim 1, wherein the length of each of said equalizing blades is such that only one of the ball-shaped dough pieces raises one blade at one time.

5. The apparatus of claim 2, wherein a downward movement of said equalizing blades is limited by a stop means carried by said two-armed lever reacting against fixed stop blocks.

6. The apparatus of claim 1, wherein said spaced transverse bars provided on said operative surfaces run perpendicularly to the general direction of operation of the apparatus.

7. The apparatus of claim 1, wherein said blades comprise an upwardly curved leading surface.

8. The apparatus of claim 1, wherein one of said equalizing blades coacts with said thrust means for delivering the substantially cylindrical dough pieces into the other of the two treatment machines.

9. The apparatus of claim 1, wherein said thrust means comprise a control mechanism responsive to a sensor actuated by the last blade of the shaping channel.

10. The apparatus of claim 1, wherein said thrust means comprises:
(a) a control mechanism responsive to a sensor actuated by one of said equalizing blades in said shaping channel;
(b) a thrust member for delivering the substantially cylindrical dough pieces;
(c) a bent arm fulcrumed about a transverse axis parallel to said transverse bars of said blades and responsive to said control mechanism, said thrust member being coupled to the end of said bent arm; and
(d) a time-lag device connected to said sensor and said control mechanism for providing a delay in slowing the delivery of the substantially cylindrical dough pieces into the other of the two treatment machines by said thrust member;
wherein said thrust member is retracted to its initial position immediately after delivering the substantially cylindrical dough pieces by an upward movement resulting from an action taken by said control mechanism on said thrust member.

* * * * *